(No Model.) 4 Sheets—Sheet 1.

B. TYSON.
AMALGAMATOR AND CONCENTRATOR.

No. 328,546. Patented Oct. 20, 1885.

Witnesses:
G. W. Kirk
J. C. Gove

Inventor:
Bryan Tyson
By Daniel Breed Atty.

(No Model.) 4 Sheets—Sheet 2.
B. TYSON.
AMALGAMATOR AND CONCENTRATOR.

No. 328,546. Patented Oct. 20, 1885.

Witnesses:
G. W. Kirk
J. G. Gove

Inventor:
Bryan Tyson
By Daniel Breed Atty (No Model.) 4 Sheets—Sheet 3.
B. TYSON.
AMALGAMATOR AND CONCENTRATOR.
No. 328,546. Patented Oct. 20, 1885.

Witnesses:
G. W. Kirk
J. C. Gove

Inventor:
Bryan Tyson
By Daniel Breed Atty (No Model.) 4 Sheets—Sheet 4.
B. TYSON.
AMALGAMATOR AND CONCENTRATOR.

No. 328,546. Patented Oct. 20, 1885.

Witnesses:
Isaac T Gibion
J. G. Hinkel

Inventor:
Bryan Tyson
By Daniel Breed, Atty.

UNITED STATES PATENT OFFICE.

BRYAN TYSON, OF WASHINGTON, DISTRICT OF COLUMBIA.

AMALGAMATOR AND CONCENTRATOR.

SPECIFICATION forming part of Letters Patent No. 328,546, dated October 20, 1885.

Application filed July 13, 1882. Serial No. 66,575. (No model.)

*To all whom it may concern:*

Be it known that I, BRYAN TYSON, of the city of Washington, District of Columbia, have invented certain Improvements in Amalgamators and Concentrators for the More Effectual and Economical Working of Gold and Silver Ores, of which the following is a specification.

The objects of my improvements are, first, to throw into the waste a large percentage of the valueless portion of the pulp, thus making my devices practicable for either quartz or hydraulic mines of any size; second, to effect a cheap and practical separation of the precious metals and other substances of value from the residue of the pulp. I attain these objects by the mechanism illustrated in the accompanying drawings, in which—

Figure 1 is a plan view of my apparatus; Fig. 1$^a$, a section thereof.

The following is a description of that portion of my apparatus which is adapted for saving gold and silver by amalgamating the same with quicksilver; also good for rusty gold.

Figures 2, 3:
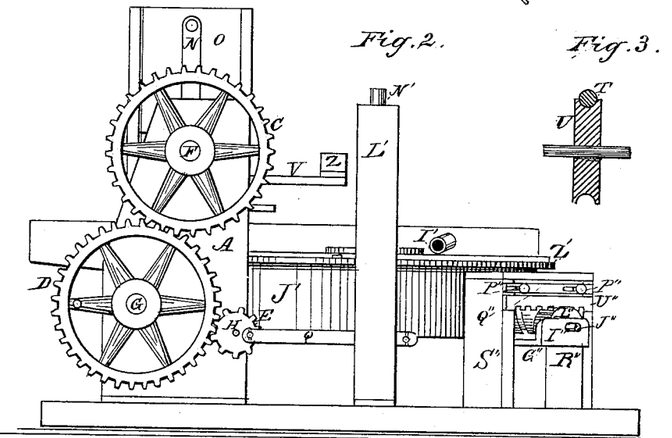
Fig. 2 is a side view of same.
Fig. 3 is a sectional view of a roller.
Figure 4:
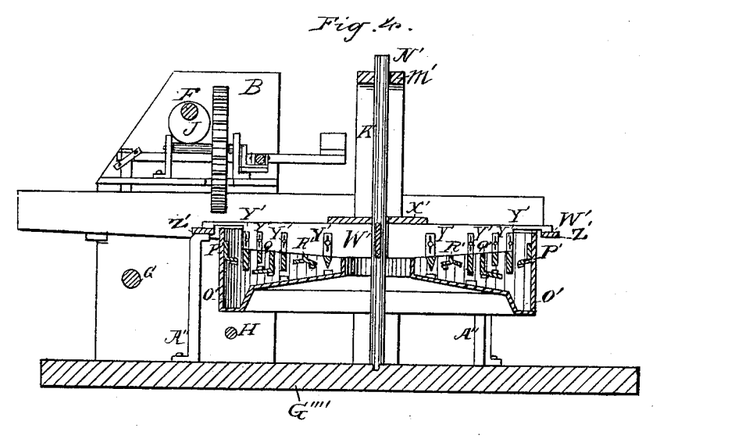
Fig. 4 is a sectional view of my apparatus.

A and B, Figs. 2 and 4, are standards upon which wheels C D E are mounted on axles F G H, the wheel E being provided with a crank-pin. Upon the axle F of wheel C are two cams, I and J, that serve to operate the plungers K K, as follows: At each revolution of the axle F, Fig. 13, the connecting-rod N, provided with a suitable aperture to fit over the cam I, is raised and lowered by said cam. The connecting-rod is secured at the upper end to the sliding board O by a bolt passed through both. Said sliding board works in a suitable groove at either side, and is raised and lowered by means of the cam I, connected therewith, as aforesaid.

Figures 10, 11, 12, 13, 14:
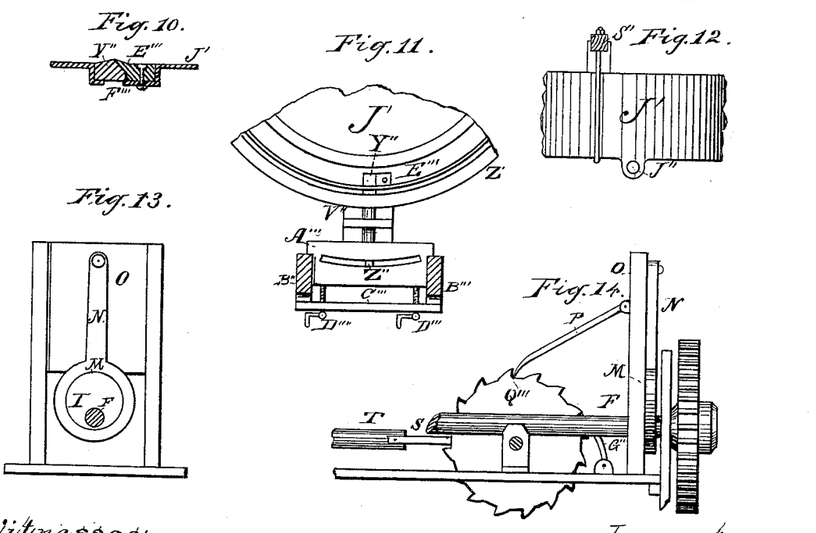
Fig. 10 is a cross-sectional view of one of the devices for discharging, cut at right angles to a radius described from the center of the pan.
Fig. 11 is a plan view of same and a section of the bottom of the pan.
Fig. 12 is a side view of a section of the pan.
Fig. 13 is a front view of sliding board, cam, axle, and connecting-rod.
Fig. 14 is a side view of same, showing also the pawl, pawl-wheel, connecting-rod, and sliding axle.

P, Fig. 14, is a pawl having one end properly secured to the sliding board O. The other end rests on the pawl-wheel Q'''. The reciprocating motion communicated to the sliding board O by means of the connecting-rod N will also give a reciprocating motion to the end of pawl P that rests on the pawl-wheel Q''', and at each downward stroke of the sliding board the pawl-wheel will be impelled forward. G''' is a dog to prevent the pawl-wheel from recoil.

Figures 1, 1A:
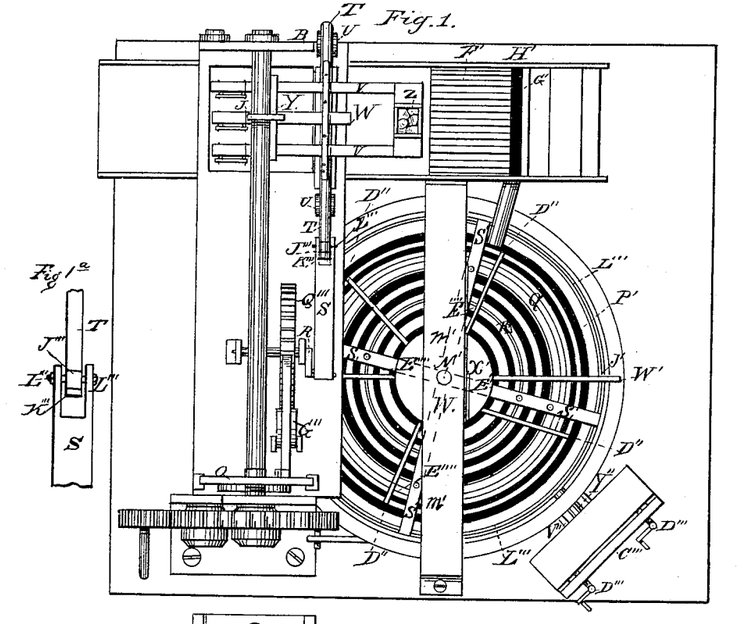

The axle of the pawl-wheel Q''', Fig. 1, is provided with a crank, R, which operates a connecting-rod, S, and axle T, giving the latter a gradual reciprocating motion to and fro.

U U, Figs. 1 and 3, are rollers that have concave faces extending entirely around them at their circumference. Said concaves or depressions are of suitable dimensions to receive the axle T, serving as bearings for the same, a roller being placed near each end of said axle.

Figure 8:
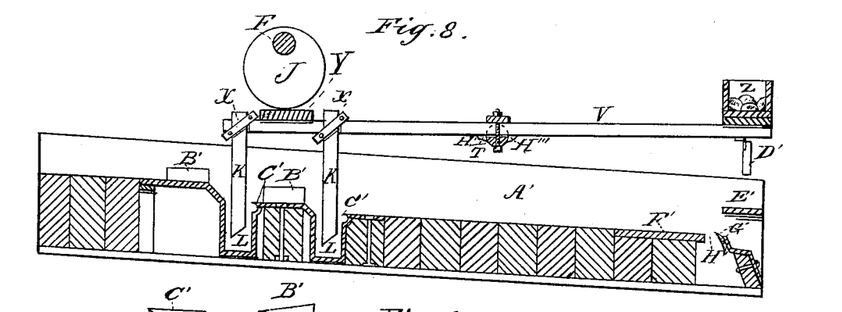
Fig. 8 is a sectional view of sluice-box, grooved riffles, plungers, and skimmer.

The axle T, Fig. 8, is provided with flanges H''' H''', which serve as supports for the bars V V W, which are properly secured to said axle, being placed across same at right angles. The two outside bars, V V, should extend about the same distance on either side of the axle, but the remaining bars, W, may be but little over half the length of the other bars, as shown. To these bars—say the ends situated upstream—the plungers K K are attached by means of clasps X X, made fast by a screw and nut, or by any other convenient mode of fastening. A suitable piece of timber or metallic bar, Y, is placed immediately under the cam J, extending across all the bars, to which it is made fast. Across the other ends of the bars V V a structure, Z, for holding stones or other weights, is placed.

A', Fig. 8, is a sluice box, in which grooved riffles L L, provided with triangular lugs B' and a plate, C', having a sharp projecting edge, are placed at right angles to the sluice. These riffles are grooves or corrugations of proper width, provided with vertical or nearly vertical walls of sufficient depth to hold a suitable quantity of quicksilver, with which they are to be filled or partially filled. They—especially the plate C'—are preferably constructed of some hard metal. From the upstream wall of the riffle extends a flange or plate, the surface of which may be constructed from one-half to three-fourths of an inch (more or less) above the general surface-plane of the plate C'. The portion of the upstream wall of the grooved riffle that is situated above the plane of the plate C' may be beveled outward at an angle of about forty-five degrees, more or less. This bevel is of great service in causing the sands that have been deflected and turned backward to be more readily discharged, as will be hereinafter more fully explained.

C' is a plate, which may be so constructed as to be reversible, properly secured by a bolt or other convenient mode of fastening. It is provided with a sharp edge that projects upstream. The construction of this plate, in connection with the downstream wall of the grooved riffle, may be such as to form a curve, or partial curve, immediately beneath said sharp edge. (See Fig. 8.) The lower stratum of sands carrying the precious metals will strike beneath the sharp edge of the plate C', and will then, by reason of the force of the flowing stream and the curve above described, be deflected backward, thus causing said sands to recross the grooved riffle. The force of the flowing stream, further increased by the fall above described at the upstream wall of the grooved riffle, is such as to subject the undercurrent, deflected as aforesaid, to considerable pressure. In order to relieve this pressure, and at the same time provide proper places of egress for said sands, I employ the following means:

B', Fig. 8, are triangular wedge-shaped lugs, a convenient number of which are placed in the sluice-box A', with the sharp ends upstream, being properly secured to the upstream flange of the grooved riffle L. The lower ends of said lugs may be constructed flush with the beginning of the bevel above described. These lugs should be of sufficient depth for their top edges to extend above the flowing sands and water. Thus arranged they divide the main sluice into a convenient number of smaller sluices. By reason of the flowing stream being parted by the lugs B' there will be but little or no pressure immediately below said lugs, thus causing the under-current to boil up with considerable force at these several places. Consequently the sands that have recrossed the riffle will, by means of said pressure, be deposited at or near the surface of the flowing streams on either side of the lugs B. The result of this will be that said sands cannot settle to a sufficient depth to again strike below the sharp edge of C', and they will therefore be washed into the waste. A constant and regular circulation of the heavier sands containing the precious metals is thus kept up, thereby affording better facilities for bringing said precious metals into contact with the quicksilver, with which the riffles are properly supplied, than is done by the usual forward movement. A bevel of the upstream wall of the grooved riffle, as already described, promotes the flowing and boiling up of the aforesaid under current.

But owing to the tenacious nature of black sand and sulphurets, one or both of which is generally present in all gold and silver mines, the foregoing cannot be considered a reliable mode for taking the precious metals, as said substances frequently form a crust of sufficient firmness over the quicksilver in the grooved riffles L L to prevent said metals from being brought into contact therewith. In order to obviate this difficulty and cause the quicksilver in the riffles to work to better advantage generally, we employ plungers K K, above described, the operation of which will now be given.

At each revolution of the axle F the cam J will impinge on the cross-piece Y, which will cause the plungers K K to descend into the quicksilver in the grooved riffles L L. The weights in the receptacle Z will raise the plungers out of the grooved riffles, suiting the action of the cam. The construction may be such that while the standard D' is resting on the support E' the cam J does not impinge on the piece Y. The standard D' is properly secured to the bars V V by means of a hinge or other device that will form a flexible joint. While the standard D' is resting on the support E', the sliding board O, Fig. 14, is made to descend, impelling forward the pawl-wheel Q''', which, by reason of the crank R and connecting-rod S, causes the axle T to change its position on the rollers U U. The plungers are thus made to change their position before each downward stroke, and by having a sufficient number of them placed at proper distances apart they can be made to traverse and keep the sands overlying the quicksilver in the grooved riffles loose throughout their entire length. Excellent facilities are thus afforded for bringing the precious metals into contact with the quicksilver.

J''', Fig. 1, is a band or ring, placed on the axle T, near the end, sufficiently loose to permit the axle to turn therein. Said ring is secured to the connecting-rod S by bolts L''', the inner ends thereof coming flush with the inside of the ring. Said bolts should be sufficiently loose to permit the connecting-rod S to work suitably to the action of the crank R.

K''' is another band or ring, placed between the ring J''' and the end of the axle, and is made fast to the axle. It serves to hold the ring J''' in position. As thus arranged the axle T will readily turn to and fro in the ring J''', in obedience to the action of the cam J and weight Z, as above described. As the axle T is impelled back and forth by means of the pawl P, operated as aforesaid, while the standard D' is resting on the support E', and while the cam J is not impinging on the piece Y there will be but little, if any, friction to overcome, as the flexible joint by which the standard D' is united to the bars V V yields and thus prevents the dragging of the foot of said standard.

The sharp edge of the plate C', Fig. 8, with curve beneath, operated in connection with the lugs B', is valuable for hydraulic or other mines where the sands overlying the quicksilver in the grooved rifles L L are not kept loose by means of the plungers K K or other appropriate machinery. When said machinery is employed, the sharp edge of the plate C', curved beneath, and the lugs B' may be dispensed with. In this case the walls of the grooved rifles L L may be constructed vertical, or nearly vertical, except the portions of the upstream walls thereof that are situated above the planes of the plates C'. These are preferably constructed on a suitable incline so as to give the desired fall, as already described.

The foregoing concludes the description of my device for taking the precious metals in a free or metallic state by the use of quicksilver; but a device to meet the requirements of the day must also be provided with suitable mechanism for taking sulphurets and other rebellious substances. I will therefore now proceed to a description of my device for taking sulphurets and other rebellious substances, such as will not readily unite with quicksilver, and are consequently usually lost when works of the foregoing character only are used.

As a preparatory measure, and especially if the quantity of pulp to be worked be large, it is necessary to first throw into the waste a large percentage of the valueless portion of the pulp. To effect this purpose, I place in the bottom of a properly-constructed sluice-box, A', a corrugated metallic plate, F', Figs. 1 and 8.

G' is a skimmer, and may be provided with sharp reversible edges, the upper edge standing a little above the surface-plane of the bottom of the grooves in the metallic plate F'. There should be a fall of at least several inches immediately after leaving the skimmer G'. The result will be that the heavier and more valuable substances will be skimmed or cut out. Said substances after dropping through the space H' will thence, by means of the pipe I', be conducted into the concentrating-pan J', which will separate the sulphurets or other substances of value from the residue of the pulp. Instead of the pipe I', we can use an ordinary sluice-box, or any other convenient mode of conveyance. The pipe or sluice-box may also be branched and run around the pan, so as to distribute the pulp at four or any other convenient number of places, thus causing a more even distribution of same.

The device above described for cutting out the heavier substances of value may or may not be employed before extracting the precious metals by means of the grooved riffles L L, as may be found best in practice.

The pan J' is circular in form, and is supported by the standards K' and L', being connected at top by the cross-beam M', Figs. 1, 2, and 4.

Figure 9:
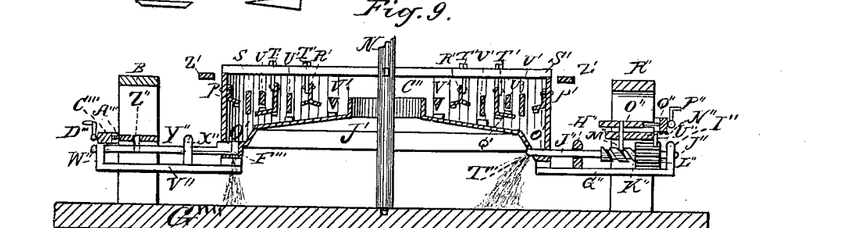
Fig. 9 is a sectional view of pan, and of the two devices for discharging concentrations.

N' is a vertical axle, to which the pan is properly secured, the lower end of the axle resting on a suitable bearing. The bottom of the pan, Figs. 4 and 9, is constructed on an incline, being lower at the circumference than toward the center. Immediately adjacent to the periphery or outside of the pan there is an annular chamber, O', preferably of uniform depth, extending entirely around the pan. The bottom of said chamber may be several inches lower than the plane of that portion of the pan situated between the said chamber and the place of discharge for waste material. The waste material may be discharged at or near the center of the pan into an open bottomless space, C''.

P' Q' R', Figs. 1, 4, 5, and 9, are annular agitators, different in form. P' is of suitable construction to admit of being made fast to the side of the pan, resembling a flange extending therefrom. For convenience in handling, it may be composed of four pieces, each piece extending one-fourth the circumference of the pan. The inner edge of this agitator should be a little lower than at the circumference. The agitator Q' is lower at the circumference than at the inner edge. From the inner edge extends a flange upward to a surface-plane of the rings U' U' V'. This flange is of suitable construction to admit of being secured to the rods T', which are suspended from the cross-bars S', Figs. 1, 9, and 12. The agitator R' is lower at each edge than at the center. From or near the center a flange, similar to that of Q', extends upward and is secured to the rods T', which are also suspended from the cross-bars S'. Any one or any selection of said patterns may be used as may be found best in practice. The bars S' cross each other at right angles, Fig. 1, and should be of sufficient size to permit the axle N' to pass through them where they cross without destroying their strength. The ends of said bars rest on the top of the pan, to which they are properly secured. In order that the cross-bars S' may be a convenient distance above the pulp in the pan, the pan may be constructed with lugs of proper depth on the top of the pan, having suitable receptacles for the bars. (See Fig. 12.)

U' U' U', Fig. 9, are rings constructed with vertical or nearly vertical sides. V', Fig. 9, is a ring triangular in form. Either one of these patterns can be used, as may be found best in practice.

W', Figs. 1 and 4, are boards of proper depth and thickness extending from four or any other convenient number of points on the annular frame Z equally distant from each other toward the center of the axle N'. The annular plate Z' is provided with a suitable number of standards A'', properly secured to the floor or foundation, thus forming a support for the boards W'. In order to support the inner ends of the boards W' they can be properly secured to a piece of metal or timber, X', which may be circular in form. In said piece is an aperture of suitable size to admit the axle N'. The boards W' serve as supports for the rings U' U' U' V', to which they may be secured by means of flanges Y', extending upward from the rings, and bolts passed through said flanges and boards, or by any other convenient mode of fastening. Slotted holes in the flanges, Fig. 4, are preferred, as they readily admit of the rings being raised or lowered, by which means any desired grade can be given the rings. But any mode of fastening that will readily admit of the formation of a grade, as aforesaid, can be employed. By raising the outer rings higher than those toward the center any desired grade can be given. By means of a proper grade the valueless portion of the pulp will be prevented from forming an inconvenient accumulation in the pan, thus affording greater facilities for precipitating and saving the substances of value. The bottom edges of the boards W' may be cut away for a suitable distance, Fig. 4, so that the ends thereof will come flush or even with the outer edge of the largest ring. Space will thus be afforded for the water and pulp to pass between the ends of said boards and the pan. The portions of said boards not cut away as aforesaid will extend over the top of the pan and rest on the annular plate Z', as already described.

Figure 5:
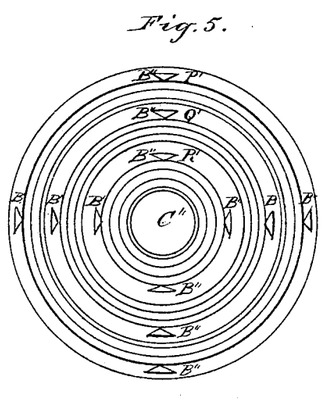
Fig. 5 is a plan view of the bottom side of the annular agitators and rings.

P' Q' R', Fig. 5, is a plan view of the bottom sides of the annular agitators, provided with triangular lugs, B'', constructed for working the sands from the circumference of the pan toward the place of discharge C''. Said lugs may be constructed for working the sands either to or from the place of discharge, as may be found best in practice. These lugs may be placed on the portions of the annular agitators situated between the boards W' and D'', or they may be generally distributed, as may be found best in practice. The boards D'' may extend from the outer edge of the first or largest stationary ring to the place of discharge C''. They may extend up to a level with the boards W', and may be held in position by strips nailed across their top edges. The boards D'' may be placed in line with the center of the axle, N', or the ends situated at the place of discharge may be placed at a greater distance from the boards W', thus creating a wider space at the point of discharge, as at E''. Said boards D'', in connection with the lugs B'', are for the purpose of collecting the valueless portion of the pulp to certain localities of the pan before taking a direct course to flow into the waste. Said boards may or may not be employed, as may be found best in practice.

Figure 7:
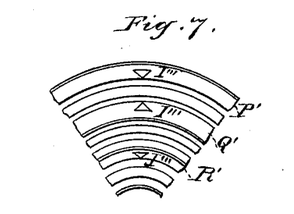
Fig. 7 is a plan view of a section of the top side of the annular agitators.

P' Q' R', Fig. 7, is a plan view of sections of the top sides of the annular agitators provided with triangular lugs I''' for working the pulp to or from the circumference of the pan. As arranged the lug on the first or largest agitator will work the sands from the circumference, the lug of the second agitator will work them toward the circumference, and the lug of the third from the circumference. We can arrange the lugs to effect either one or both of said purposes, as may be found best in practice. These lugs may or may not be employed, as may be found best in practice.

Figure 6:
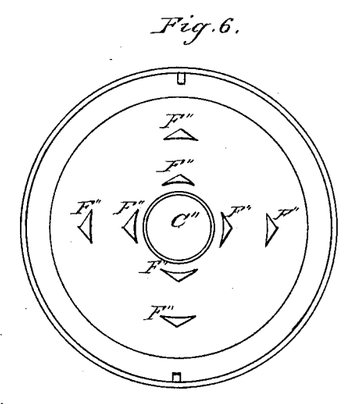
Fig. 6 is a plan view of the bottom of the pan.

The bottom of the pan J', Fig. 6, may be provided with triangular lugs F'', constructed for working the heavier and more valuable substances that may have been precipitated to the bottom of the pan toward the annular chamber O', from which they will ultimately be discharged by means of devices that I will now describe.

Figure 15:
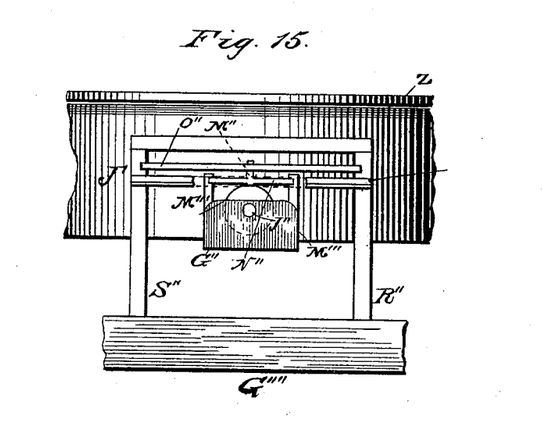
Fig. 15 is a side view, and Fig. 16 a sectional view, of the discharging mechanism for the concentrations.
Figure 16:
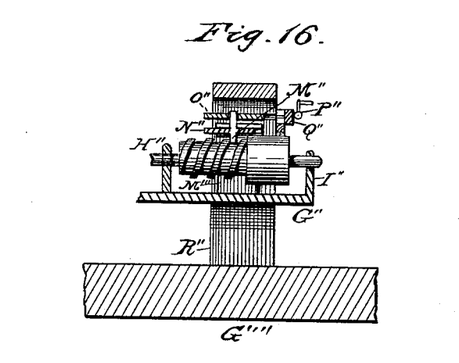

At Fig. 9 we have a sectional view of two devices for discharging concentrations, one of which is automatic, the following being a description thereof:

G'', Figs. 2 and 9, is a bracket made fast to the bottom of a niche in the annular chamber O' of the pan J'. Said bracket supports bearings H'' and I'', on which the shaft J'', provided with a spiral groove, K'', and pinion L'', works. Said bracket also sustains two boards, M''', one on either side, placed at right angles to the bearings H'' and I''. Said boards contain each a groove, in which the ends of the sliding board N'' work. (See Figs. 15 and 16.)

M'' is a lug, and may be square in form, made fast in the sliding board N'', through which it passes. The lower end of said lug extends downward and fits snugly in the spiral groove K''. The upper end extends upward through a circular slot in the sliding board O'', in which it works to and fro. Said slot is described by a radius from the center of the pan. (See Figs. 9, 15, and 16.)

R'' S'' are posts properly secured at the bottom to the floor G'''' or other foundation, and contain each a groove, in which the ends of the sliding board O'' work.

Q'' is a piece of timber or other suitable material made fast to the posts R'' S''. Said piece serves as a support for the crank-pins P'' P'', through which they pass, and are properly secured to prevent sliding. These pins are provided with screws that fit into holes in the sliding board O'', by which means said board can, by turning the crank-pins, be drawn inward or outward, as may be desired.

U'' is a bar, circular in form, being described by a radius from the center of the pan J'. It contains gear-teeth that gear into the pinion L″, and is made fast to the posts R″ S″ or to other stationary supports. (See Figs. 2, 9, 15, and 16.) One end of the shaft J″ works in a niche in the pan J′, Fig. 12, by which means the top of said shaft may be brought on a level with the bottom of the circular chamber O′.

T″, Fig. 9, is an aperture through the inner wall of the annular chamber O′. Through this aperture the shaft J″ works, being alternately inserted and withdrawn therefrom by means of the reciprocating motion given thereto by the spiral groove K″ and lug M″, thus causing the concentrations to be discharged at each forward movement of the shaft J″. By turning the crank-pins P″ P″, Figs. 15 and 16, the circular slot in the sliding board O″ will be made to impinge on the lug M″ that works back and forth in said slot. The sliding board N″, in which the lug M″ is made fast, will thus receive a movement similar to the movement that has been given the sliding board O″ by the means aforesaid. In this way the two sliding boards can be moved in conjunction inward or outward, as may be desired, by turning the crank-pins P″ P″, as already described. Changing the position of the two sliding boards will also change the position of the end of the lug M″ that fits into the spiral groove K″, and this in turn will change the position of the end of the shaft J″ that works through the aperture T″. It is in this way that the discharge at T″ can be regulated to any desired quantity. Thus, when we wish to decrease the discharge, the sliding board O″ is by the action of the crank-pins moved nearer the pan. This movement causes the end of the shaft J″ to protrude farther through the aperture T″ at each forward movement. Consequently, when the shaft is withdrawn, there is less space between the end of said shaft and aperture T″ for the concentrations to drop into before being pushed through said aperture by the forward movement of the shaft. If we wish to increase the discharge of concentrations, the crank-pins P″ P″ are turned in an opposite direction, so as to draw the sliding board from the pan. This will cause the end of the shaft J″ to be withdrawn correspondingly, thus admitting of a larger quantity of concentrations to be deposited immediately in front of the end of the shaft before being pushed through the aperture T″ by the forward movement of same, as already described; but it will be impracticable to so regulate the discharge as to take out the entire quantity of concentrations without also taking out with them some of the valueless portion of the material. In order to obviate this difficulty, I propose to so regulate said discharge, by means already described, as to discharge as large a percentage of clean concentrations as can be safely done without discharging a portion of the valueless portion of the pulp therewith. To do this properly, the discharge of concentrations should be a little less in quantity than the supply to the pan. An accumulation of concentrations would thus occur which would eventually fill the pan and overflow into the waste. In order to prevent this waste, I employ another mode of discharge, to be used occasionally as necessity may require, which will now be described.

In the bottom of the annular chamber O′, Fig. 10, we have a niche of proper dimensions, provided with an aperture, F‴, in the bottom thereof, for discharging the concentrations. E‴ is a die properly secured to the bottom of the niche, provided with a sharp projecting edge that may be slightly elevated above the plane of the bottom of the annular chamber O′. Said die may be constructed to occupy about one-half of the niche.

Y″ is a sliding bar having the side fitting against the die E‴ elevated to the same height of the projecting edge of the die. This bar fills the remainder of the niche, and is made to cover or uncover the aperture F‴ by means as follows:

V″, Figs. 9 and 11, is a bracket made fast to the bottom of the niche above described, and serves as a support for the pieces W″ and X″, through holes in which the sliding bar Y″ works. To the top side of said bar is affixed a lug, Z″, which extends upward through a circular slot in the sliding board A‴, in which it works back and forth.

B‴ B‴ are standards properly secured at the bottom to the floor G‴, or other foundation. Each of said standards is provided with a groove suitable for the reception of the ends of the sliding board A‴.

C‴ is a bar properly secured to the standards B‴ B‴, and serves as a support for the crank-pins D‴ D‴, through which they pass, and are properly secured to prevent sliding. Said crank-pins are provided with screws that are properly fitted into holes in the sliding board A‴. Thus arranged the discharge through the aperture F‴ is regulated as follows: When desirable to open said aperture, the crank-pins D‴ D‴ should be so turned as to draw the sliding board A‴ from the pan. This will cause the lug Z″ to impinge on the inner edge of the circular slot in said sliding board, by which means the sliding bar Y″ will be withdrawn, thus exposing the aperture F‴, through which the concentrations will fall. When desirable to close said aperture, the crank-pins should be turned in an opposite direction until the end of the sliding bar is projected against the inner wall of the niche, against which it should fit snugly, thus preventing any leakage.

Both of the above-described devices can be regulated as desired while the pan is in operation. In fact, they can be more readily regulated when the pan is in operation than when standing still.

Another method for working pulp and procuring concentrations will be to work two of my concentrators in conjunction, one of which may be provided with the automatic discharge only, the other with both, as above described, operated as follows: A coarser screen than usual may be employed. The automatic discharge of the first concentrator may be so regulated as to discharge a proper quantity of the pulp with the concentrations. The substances thus discharged may be run through concentrator No. 2, which will procure clean concentrations. Much of the pulp washed into the waste from the second concentrator will be valuable, many of the particles thereof being partially composed of metal. The pulp that is washed into the waste from this concentrator should therefore be caught and reworked through a finer screen, by which means the metal and sulphurets in said particles will be liberated, and may then be extracted therefrom in the usual way.

Great advantages would follow the adoption of the above plan for working the pulp first through a coarse screen and then the more valuable substances through a finer screen, as described.

Having given a general description of my several devices the operation thereof will be better understood from the following detailed statement:

The wheel E, Fig. 2, is provided with a crank-pin that is connected with the pan J' by the connecting-rod Q. By turning the wheel D a reciprocating motion to and fro is given the pan. The bars S' being made fast to the pan, and the annular agitators Q' R' being suspended therefrom by means of the rods T', any reciprocating motion that may be given the pan will be communicated to said agitators. The annular agitator P' being made fast to the side of the pan, will of course receive a movement similar to that of the pan.

The object for placing the annular agitators and rings on the inside of the pan and operating them in conjunction is to give to the pulp at the surface, where most needed, a peculiar and thorough agitation. By means of said combination I am enabled to procure a vertical and horizontal agitation, which is very favorable for arresting and precipitating the substances of value. The efficiency of said combination is rendered still more effective by placing the annular agitators and rings on a grade, as already described. The triangular lugs placed on the annular agitators and on the bottom of the pan, as described, will also render valuable service. The arrangement of those on the under side of the agitators is such as to work the pulp across them, generally from the outer to the inner edge, thus drawing the pulp under them, by which means said agitators are caused to render valuable service on their under sides by creating a general circulation as well as agitation of the pulp.

Having described my invention, what I claim as new, and desire to secure by Letters Patent, is—

1. The combination of the sluice-box and grooved riffles L L, provided with triangular lugs B', and a plate, C', having a sharp projecting edge, and the plungers K K, operated by the axle F, cam I, connecting-rod N, sliding board O, pawl P, pawl-wheel Q''', crank R, connecting-rod S, sliding axle T, bars V V W, and cam J, substantially as and for the purpose described.

2. The combination of the concentrating-pan J', provided with triangular lugs and an annular chamber, O', and annular agitators P' Q' R', the former secured to the side of the pan, the two latter suspended from the cross-bars S' by the rods T', and rings U' U' V', secured to boards W', which are supported by the annular plate Z', operated by the wheel E, provided with a crank-pin, and connecting-rod Q, substantially as and for the purposes set forth.

3. The combination of the concentrating-pan J', provided with an annular chamber, O', annular agitators P' Q' R', rings U' U' V', which are properly secured to the boards W', said boards resting on and being supported by the annular plate Z', and the two devices for discharging concentrations, operated by the wheel E, provided with a crank-pin and rod Q, substantially as and for the purposes described.

4. The automatic device for discharging concentrations provided with a bracket, G''', secured to the bottom of a niche in the bottom of the annular chamber O' of the pan J', bearings H'' and I'', shaft J'', provided with a pinion, L'', and spiral groove K'', lug M'', sliding boards N'' and O'', bar U'', and crank-pins P'' P'', substantially as and for the purposes described.

5. The combination of the pan J', provided with an annular chamber, O', having an aperture, T'', the annular agitators P' Q' R', rings U' U' U' V', wheel E, provided with a crank-pin, connecting-rod Q, and the automatic device for discharging concentrations provided with a bracket, G''', secured to the bottom of a niche in the bottom of the annular chamber O', bearings H'' and I'', shaft J'', provided with a pinion, L'', and spiral groove K'', lug M'', sliding boards N'' and O'', bar U'', and crank-pins P'' P'', substantially as and for the purposes described.

6. The device for the occasional discharge of concentrations provided with a bracket, V''', secured to the bottom of a niche in the annular chamber O', an aperture, F''', in the bottom of the niche, pieces W'' and X'', secured to the bracket, sliding bar Y'', die E''', lug Z'', sliding board A''', and crank-pins D''' D''', substantially as and for the purposes described.

7. The combination of the pan J', provided with an annular chamber, O', and a niche in the bottom of said chamber having an aperture, F''', in the bottom of the niche and annular agitators P' Q' R', rings U' U' U' and V', wheel E, provided with a crank-pin and connecting-rod Q for oscillating same, and the device for the occasional discharge of concentrations provided with a die, E''', secured to the bottom of the niche, bracket V'', secured to the bottom of the niche, an aperture, F''', in the bottom of the niche, pieces W'' and X'', secured to the bracket, sliding bar Y'', and crank-pins D''' D''', substantially as and for the purposes described.

In testimony whereof I affix my signature in presence of two witnesses.

BRYAN TYSON.

Witnesses:
   DANIEL BREED,
   FRED G. DIETERICH.